US011212480B2

(12) United States Patent
Gyurasz

(10) Patent No.: US 11,212,480 B2
(45) Date of Patent: Dec. 28, 2021

(54) BRIGHTNESS AND CONTRAST OPTIMIZATION OF IMAGES IN REAL TIME

(71) Applicant: Robert Bosch GmbH, Stuttgart (DE)

(72) Inventor: Gabor Gyurasz, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/652,306

(22) PCT Filed: Sep. 3, 2018

(86) PCT No.: PCT/EP2018/073609
§ 371 (c)(1),
(2) Date: Mar. 30, 2020

(87) PCT Pub. No.: WO2019/072454
PCT Pub. Date: Apr. 18, 2019

(65) Prior Publication Data
US 2020/0242743 A1 Jul. 30, 2020

(30) Foreign Application Priority Data

Oct. 11, 2017 (DE) .......................... 102017218072.2

(51) Int. Cl.
*H04N 5/57* (2006.01)
*G06T 5/00* (2006.01)
(Continued)

(52) U.S. Cl.
CPC .............. *H04N 5/57* (2013.01); *G06T 5/008* (2013.01); *H04N 5/067* (2013.01); *H04N 5/2351* (2013.01); *G06T 2207/20021* (2013.01)

(58) Field of Classification Search
CPC ........ H04N 5/57; H04N 5/2351; H04N 5/067; G06T 5/008; G06T 2207/20021
See application file for complete search history.

(56) References Cited

U.S. PATENT DOCUMENTS

2005/0123211 A1* 6/2005 Wong .................. H04N 5/3675
382/254
2007/0268534 A1 11/2007 Duan et al.
(Continued)

FOREIGN PATENT DOCUMENTS

EP 1742178 A2 1/2007
JP 2010193199 A 9/2010
(Continued)

OTHER PUBLICATIONS

International Search Report for PCT/EP2018/073609, dated Dec. 13, 2018.
(Continued)

*Primary Examiner* — Casey L Kretzer
(74) *Attorney, Agent, or Firm* — Norton Rose Fulbright US LLP; Gerard Messina

(57) ABSTRACT

A method for recording an image. The method includes: detecting an area using a sensor and generating a map of the area having a predefined number of pixels, which indicate brightness values, and subdividing the map into blocks) having a predefined first size, creating an auxiliary map by scaling down the blocks to a predefined second size, which is smaller than the predefined first size, sorting the pixels of each block of the auxiliary map according to their brightness values, determining processing parameters for each block on the basis of the sorted pixels, with which the pixels of the associated block are processed in order to achieve a brightness maximization and/or a contrast maximization, interpolating a processing function from the processing parameters, and applying the processing function to the pixels of the map to generate the image.

9 Claims, 4 Drawing Sheets

(51) Int. Cl.
*H04N 5/067* (2006.01)
*H04N 5/235* (2006.01)

(56) References Cited

U.S. PATENT DOCUMENTS

| | | | | |
|---|---|---|---|---|
| 2008/0259007 | A1* | 10/2008 | Chiu | G09G 3/2011 345/77 |
| 2011/0257949 | A1* | 10/2011 | Vasudevan | G06F 17/18 703/2 |
| 2014/0375759 | A1* | 12/2014 | Mikes | H04N 5/23238 348/36 |
| 2015/0071537 | A1* | 3/2015 | Lim | G06T 5/40 382/168 |
| 2016/0070974 | A1* | 3/2016 | Bai | G06K 9/4642 382/169 |
| 2018/0139429 | A1* | 5/2018 | Park | G09G 5/10 |

FOREIGN PATENT DOCUMENTS

| | | |
|---|---|---|
| JP | 2011135182 A | 7/2011 |
| JP | 2018101165 A | 6/2018 |

OTHER PUBLICATIONS

Pizer S M et al., "Adaptive Histogram Equalization and Its Variations", Computer Vision Graphics and Image Processing, Academic Press, Duluth, MA, US, vol. 39, No. 3, 987, pp. 355-368, XP001002914.

Hwa-Hyun Cho et al., "Efficient Image Enhancement Technique by Decimation Method", IEEE Transactions on Consumer Electronics, vol. 51, No. 2, 2005, pp. 654-659, XP055529889.

Uche A. Nnolim., "Design and Implementation of Gain-Offset Correction Algorithm Hardware Architecture for Grayscale and Color Images Contrast Enhancement", Journal of Circuits, Systems and Computers., vol. 25, No. 10, 2016, pp. 1650120, XP055528454.

Li Tao et al., "Adaptive and Integrated Neighborhood-Dependent Approach for Non-Linear Enhancement of Colour Images", Journal of Electronic Imaging 14(4):043006, 2005.

Tsai, C. et al., J Image Video Proc. (2011)2011:6. DOI:10.1186/1687-5281-2011-6.

Szeliski, R.: Computer Vision. Springer. 2011, pp. 89-98.

Cao, G. et al., "Accelerate Histogramm-Based Contrast Enhancement by Selective Downsampling", Sep. 14, 2017, ARXIV:1709.04583V1. Aufgerufen Uber URL https://arxiv.org/abs/1709.04583v1.

* cited by examiner

BRIGHTNESS AND CONTRAST OPTIMIZATION OF IMAGES IN REAL TIME

FIELD

The present invention relates to a method for recording an image. An optimization of brightness and/or contrast of the image take/takes place, in particular, in real time. The present invention further relates to a computer program and a control unit for carrying out the method.

BACKGROUND INFORMATION

Various algorithms are described in the related art for optimizing images. Thus, for example, the AINDANE algorithm is described in the following document: "Li Tao and Vijayan K. Asari: Adaptive and integrated neighborhood-dependent approach for non-linear enhancement of colour images, Journal of Electronic Imaging 14(4):043006—October 2005."

The SCRCLCE method is described in the following document: "Tsai, C. & Chou, C. J Image Video Proc. (2011)2011:6. doi:10.1186/1687-5281-2011-6."

However, all these algorithms and methods require considerable computing resources in order to process images in real time. Thus, correspondingly rapidly clocked CPUs (central processing unit) are required, which are provided in desktop computers or in laptop computers. Equally, rapid GPUs (graphics processing unit) or specialized image processing hardware such as, for example, configured FPGAs (field programmable gate array) may also be used. However, all these technologies are not usually present in control units. Control units are, in particular, embedded systems used, for example, in vehicles, monitoring systems, etc., no expensive hardware being used in order to minimize the costs of the system. Thus, an application of the aforementioned optimization methods is not possible.

SUMMARY

An example method according to the present invention provides a new approach. The example method may be effectively used on SIMD (single instruction, multiple data) coprocessors, for example, on the ARM NEON coprocessor. Thus, the example method may be optimally carried out on microprocessors. The example method may, for example, be used at 60 frames per second on an 8 bit grayscale image having a resolution of 752×640 pixels, merely the SIMD capabilities of the ARM NEON coprocessor being required and merely a minimal CPU load occurring. The example method may also be used on other SIMD architectures, however.

The example method according to the present invention for recording an image includes the following steps: an area of the surroundings is initially detected with a sensor. A map is also produced, which includes a predefined number of pixels, the pixels indicating brightness values. The map is therefore a visual representation of the detected area of the surroundings. The sensor is, in particular, an imaging sensor. The map is subsequently subdivided into blocks having a predefined first size. The predefined first size of the blocks corresponds, in particular, to the size of those features of the map that are to be retained during the subsequent processing. An auxiliary map is then created by scaling down the blocks to a predefined second size, which is smaller than the first size. For this purpose, a subsampling method, in particular, is applied. By scaling down, the number of pixels within the blocks is reduced in such a way that a smaller number of pixels is available in order to carry out additional processing steps. This enables the subsequent step of sorting the pixels of each block of the auxiliary map according to their brightness values. Such a sorting of the pixels is implementable simply and with little effort. Conventional, highly efficient sorting algorithms, in particular, are available for sorting pixels. By scaling down, the number of pixels is reduced in such a way that a rapid sorting may be carried out.

Such a sorting may, in particular, be implemented in parallel, which yields significant advantages compared to conventional measures.

After the sorting, processing parameters are determined on the basis of the sorted pixels. The pixels of each block are to be processed using the processing parameters in order to achieve a brightness maximization and/or a contrast maximization. Thus, since the parameters are determined blockwise, a local optimization of the brightness and a local optimization of the contrast takes place in each case. Hence, this allows the computing power for determining the processing parameters to be reduced, since the processing parameters are always only locally determined, but not globally for the entire image.

This is followed by an interpolation of a processing function from the processing parameters. The processing function enables each single pixel of the originally captured map to be processed. Thus, finally, the processing function is applied to the pixels of the map. In this way, the image is produced. The image thus has an optimized brightness as well as an optimized contrast. The entire method in this case may be carried out in real time on a microprocessor so that it is possible to carry out the optimization of the brightness and/or of the contrast, in particular, also in embedded systems. In this way, it is possible to use, in particular, optimal images in vehicles and/or in monitoring systems and/or in other integrated applications.

Preferred refinements of the present invention are described herein.

It is preferably provided that a predefined number of maximum brightness values and/or a minimum number of brightness values are/is not taken into consideration when determining the processing parameters. By scaling down, there is the risk of introducing inaccuracies into the auxiliary map. Thus, the scaling down may take place in such a way that a predefined number of pixels is transferred to a single pixel. This single pixel may include either the average value of all pixels or merely the value of one single pixel of the aggregate pixels. In the first case, no inaccuracy is introduced into the auxiliary map. In the second case, there is the risk of an image noise occurring. In order to reduce the image noise, it is provided that the predefined number of maximum brightness values and/or minimal brightness values per block is not taken into consideration. To determine the processing parameters, only a set of pixels that includes no boundary values is used in each block. Boundary values in this case are to be considered as maximum brightness values or minimum brightness values. The boundary values are defined, in particular, as a function of the pixels to be processed. A quantile filter is defined, in particular, by disregarding the maximum brightness values and/or minimum brightness values.

It is advantageously also provided that a scaling factor is determined as a processing parameter for each block of the auxiliary map. The maximum brightness value of the block is to be scaled using the scaling factor, in order to achieve a maximum brightness value, which is representable by one pixel. The brightness of the block is thus maximized. At the same time, it is ensured that no saturation occurs, as a result of which pieces of image information would be lost. It is therefore ensured by the choice of the scaling factor that even the brightest pixels still remain beyond saturation. The dimmer pixels are thus maximally brightened by the scaling factor.

An offset value and a multiplier are advantageously also to be ascertained as processing parameters for each block. The offset value is ascertained, in particular, on the basis of a minimal brightness value of the pixels of the block. The multiplier is preferably ascertained based on the distribution of the brightness values of the pixels of the block. In this way, the brightness values of the pixels of each block may be extended between a maximum brightness value and a minimum brightness value after subtraction of the offset value and subsequent multiplication by the multiplier. The maximum brightness value and the minimum brightness value are extreme values that are representable by the pixel. This means that a contrast is optimized. A maximum value range, which is implementable by one pixel is, in particular, utilized to the extent possible. This means that darker pixels are maximally darkened, whereas brighter pixels are maximally brightened. At the same time, it is ensured that no saturation occurs, so that no loss of information of any kind is present. It is also ensured that individual pixel values are not lost, this means that a lowering to mathematically below zero does not take place. Thus, it is ensured, in turn, that no loss of information occurs.

A predefined tolerance range is preferably disregarded in the above-described maximum brightness values and/or minimum brightness values that are representable by one pixel. This means that the maximum value that a pixel may assume is not considered to be the maximum brightness value of a pixel, but a value, which is calculated from the theoretically maximum possible value minus the tolerance range. The same applies for the minimum brightness value, which is calculated from the minimum value, in particular, from the value zero, plus the tolerance range. In this way, it may be ensured that during a further processing, in particular, during the application of the processing function after interpolation of the processing parameters, each processed pixel remains safely and reliably within the representable range. Thus, no saturation occurs, as a result of which the risk of a loss of information is reduced.

The step of interpolation advantageously includes a two-dimensional sectional polynomial interpolation. For this purpose, a third degree polynomial is used. The third degree polynomial extends advantageously over three adjacent processing parameters, respectively. The polynomials have the same value and the same first derivation at transition points between two polynomials. Thus, the processing function is constant and differentiable over the entire range of the processing parameters. The polynomial interpolation advantageously takes place in such a way that initially an interpolation takes place in one direction of the processing parameters arranged as a matrix, subsequently an interpolation takes place in a second direction. Thus, the two-dimensional interpolation is achieved. This means that one processed pixel of the final image may be calculated for each pixel of the originally created map. This requires merely the coordinates of the pixel in the x-direction and y-direction. The polynomial interpolation is particularly advantageously a second step of a two-stage interpolation method. In this case, a bilinear interpolation of pixels takes place in the first step in order to expand one pixel to form a pixel block, for example, an 8×8 pixel block.

It is advantageously provided that the second predefined size corresponds to 8×8 pixels. Thus, a sorting of merely 64 pixels must take place. An 8×8 pixel block may be highly efficiently sorted in parallel by a conventional bitonic sorter. Generally, the second predefined size is to be advantageously adapted to the number of the NEON registers. This means that an 8×16 pixel block represents the largest second predefined size, which may be implemented using conventional NEON architectures. To enable an efficient sorting, it is therefore advantageously provided that the second predefined size corresponds to 8×8 pixels.

The present invention also relates to a computer program. The computer program is configured to carry out the example method as described above. The computer program is, in particular, a computer program product, including instructions which, when they are executed on a computing device, prompt the processor to carry out the above-described steps of the above-described example method. The processor of the computing device is, in particular, the microprocessor of a control unit.

The present invention also includes a machine-readable memory medium. The above-described computer program product is stored on the machine-readable memory medium.

Finally, the present invention includes a control unit. The control unit is used for carrying out the above-described example method. Thus, it is provided, in particular, that the control unit is coupled to a sensor for signal transmission in order to enable a detection of an area. In addition, the control unit may particularly advantageously carry out the computer program as described above.

The above-described example method is advantageously suitable both for color images as well as grayscale images. In each case, it is provided that when the above defined method is carried out, the pixels indicate a luminance of a color image or a gray value of a grayscale image. A luminance of the color image is not relevant for carrying out the above-described method and may therefore be disregarded. The pixels are advantageously 8 bit values, which indicate the luminance and/or gray values. These values are therefore brightness values on a scale between 0 and 255.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
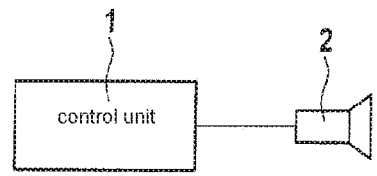
FIG. 1 is a schematic depiction of a system for carrying out a method according to one exemplary embodiment of the present invention.
Figure 2:
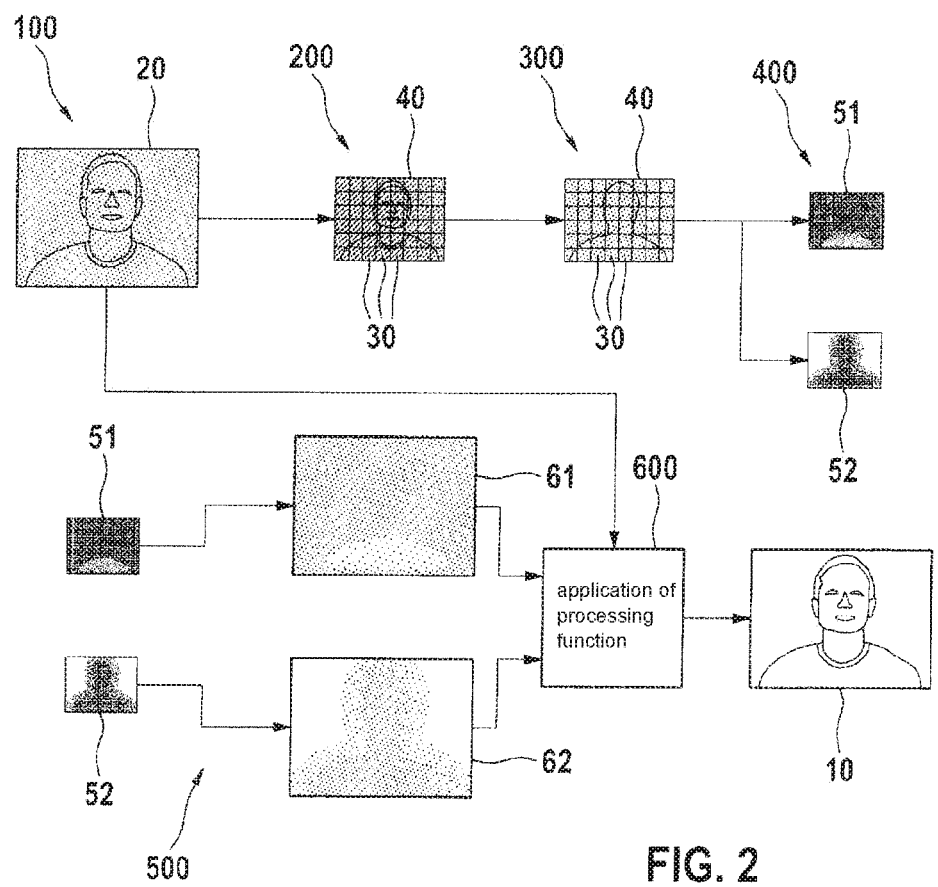
FIG. 2 is a schematic view of a sequence map of the method according to the exemplary embodiment of the present invention.

FIG. 1 schematically shows an example system for carrying out an example method according to one exemplary embodiment of the present invention. The system includes a control unit 1 and a sensor 2. The method described below is preferably implementable on control unit 1. The method is used to record and optimize images in real time. A sequence map of the method is schematically depicted in FIG. 2.

An area of the surroundings is initially detected 100 using sensor 2. In the process, a map 20 is produced, which has a predefined number of pixels, each of which indicates brightness values. Each pixel carries, in particular, an 8 bit value, which represents the aforementioned brightness. For example, the map 20 may have a resolution of 752×640 pixels.

Map 20 is subdivided into blocks 30 having a predefined first size. The predefined first size corresponds, in particular, to a size that includes individual image features, which are to remain present in any case, even after the processing. An auxiliary map 40 is then created 200 by scaling down blocks 30 to a predefined second size. The predefined second size is smaller than the predefined first size and is, in particular, 8×8 pixels.

The pixels of each block 30 of auxiliary map 40 are subsequently sorted 300 according to their brightness values. Such a sorting is carried out, in particular, by a conventional bitonic sorter algorithm. The aforementioned bitonic sorter algorithm may be advantageously implemented in a NEON assembler language having 64 8 bit input parameters. This enables a highly efficient parallel sorting of the pixels per block. The sorting of pixels is therefore implementable in a very short period of time, as a result of which the real time capability of the method according to the exemplary embodiment of the present invention is ensured, even if the method is carried out on a SIMD coprocessor, such as the ARM NEON coprocessor. The aforementioned ARM NEON coprocessor is advantageously part of control unit 1 as described above.

The advantage of the step of sorting 300 is, in particular, that only a limited number of pixels are required to be sorted. On the one hand, therefore, the number of pixels to be sorted in total is reduced by the scaling down during the creation 200 of auxiliary map 40, on the other hand, the individual pixels to be sorted are in turn reduced via the subdivision with the aid of blocks 30. At the same time, an advantage is provided with respect to the memory usage, since the sorting of the pixels requires no additional memory space. In contrast thereto, conventional optimization methods, which are usually based on a histogram adaptation, would require additional memory space for calculating the histogram.

A determination 400 of processing parameters 51, 52, with which the pixels of each block 30 are processed, takes place on the basis of the sorted pixels, in order to achieve a brightness maximization and/or contrast maximization. It is provided in particular, that a contrast maximization takes place on the basis of first processing parameters 51, whereas a brightness maximization takes place on the basis of second processing parameters 52. Thus, processing parameters 51, 52 are available for each block. This means that the number of processing parameters corresponds to the number of blocks. One processing parameter in this case may include a single processing factor and/or multiple processing factors for processing the pixels. Processing parameters 51, 52 may each be arranged in a matrix. In this case, the representation of processing parameters 51, 52 as a result of the matrix corresponds to the arrangement of blocks 30 within auxiliary map 40. Thus, it is provided, for example, that a processing parameter in an upper left corner of the matrix is assigned to upper left block 30 of auxiliary map 40. This means that the matrix represents individual supporting points, which may be used for an interpolation in order to generate a processing function 61, 62, which is valid for entire map 20. For this purpose, an interpolation 500 of processing function 61, 62 from processing parameters 51, 52 takes place. Interpolation 500 takes place, in particular, in two stages. In a first stage, a bipolar interpolation takes place, individual pixels being extended to an 8×8 pixel block during the bipolar interpolation. This may be implemented in a NEON assembler language simply and with little effort. In a second stage, the interpolation of the individual processing parameters 51, 52 takes place at the predefined first size of blocks 30. This second stage should not generate any interpolated values, as a result of which the limits of the original data set, i.e., the limits of the processing parameters are exceeded. There is otherwise the risk of impairing the above-described bipolar interpolation of the first stage.

An application 600 of processing function 61, 62 on the pixels of map 20 takes place as a final step. In this way, image 10 is creatable. In this case, the entire process of creating image 10 is real-time capable, as a result of which a real-time video stream is generatable, which is optimized with respect to brightness and contrast. For processing function 61, 62, in turn, it is the case that preferably a first processing function 61 is present, via which a contrast is optimizable, whereas a brightness is optimizable via a second processing function 62.

Individual aspects of the above-described steps of the method according to the present invention are described below with reference to FIGS. 3 through 8.

The scaling down during the creation 200 of auxiliary map 40 may take place in different ways. In each case, a predefined number of pixels is combined to form one single pixel. This single pixel may have either the average value of all combined pixels or alternatively the value of a single pixel of the pixels to be combined. In the first case, no inaccuracy is introduced into auxiliary map 40, at the same time a computing effort is increased, since the average value of the pixels to be combined must be calculated. Thus, the second described possibility advantageously takes place, i.e., an assignment of an individual value from the pixels to be combined to the resulting pixel. Since a large plurality of pixel values is therefore disregarded, there is the risk of introducing an image noise into auxiliary image 40. In order to dampen such noise, a predefined number of maximum brightness values 5 and/or minimum brightness values 4 are/is disregarded, in particular, for each block 30, when determining 400 processing parameters 51, 52. This is depicted in FIG. 3.

Figure 3:
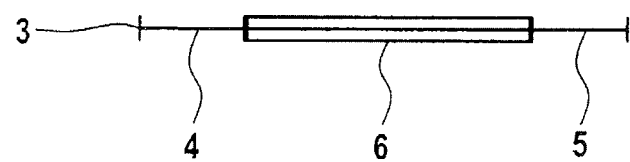
FIG. 3 is a schematic representation of the sorted pixels during the method according to the exemplary embodiment of the present invention.

FIG. 3 schematically shows a representation of an extension range 3, over which the brightness values of the pixels per block 30 extend. To ascertain processing parameters 51, 52, only one middle range 6 is used, so that a predefined number of minimum brightness values 4, as well as a predefined number of maximum brightness values 5 is disregarded. In this way a quantile filter is implemented. Thus, the potential image noise of auxiliary map 40 may be effectively countered.

Figure 4:
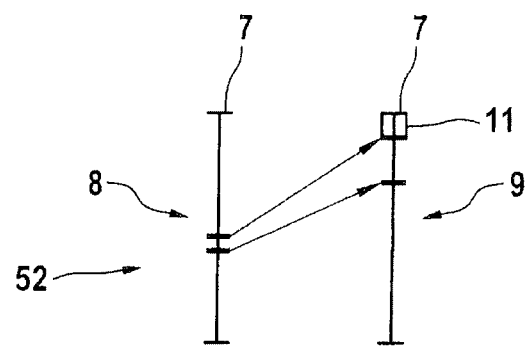
FIG. 4 is a schematic representation of the determination of processing parameters according to a first alternative when carrying out the method according to the exemplary embodiment of the present invention.

FIG. 4 schematically shows the determination of second processing parameter 52. In this case, original pixels 8 are to be processed to form improved pixels 9. A maximum extension range 7 is shown in each case in FIG. 4, which represents a value range that each pixel may assume. A brightness is intended to be maximized via second processing parameter 52. Therefore, a scaling factor is determined, which is to be used for scaling the brightness values of the pixels of each block 30. In the example shown in FIG. 4, original pixels 8 exhibit a brightness curve, which is in a lower half of extension range 7. On the basis of the scaling factor, it is possible to achieve a range in processed pixels 9, which is in an upper maximum range of extension range 7. Merely an upper tolerance range 11 is disregarded. This means that, as a result of the scaling factor, the pixels are unable to reach the maximum possible value of 255, but merely a lower value.

The scaling factor is determined on the basis of the brightest pixel of each block 30. For this purpose, it is ascertained by which factor the value of the brightest pixel of block 30 is to be multiplied, in order to obtain a maximum value which is representable by one pixel, in particular, minus upper tolerance range 11. In this way, it is possible to ascertain a scaling factor for each block 30 in order to thus obtain second processing parameter 52.

Figure 5:
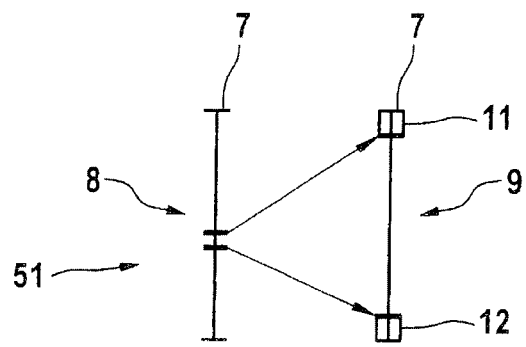
FIG. 5 is a schematic representation of the determination of processing parameters according to a second alternative when carrying out the method according to the exemplary embodiment of the present invention.
Figure 6:
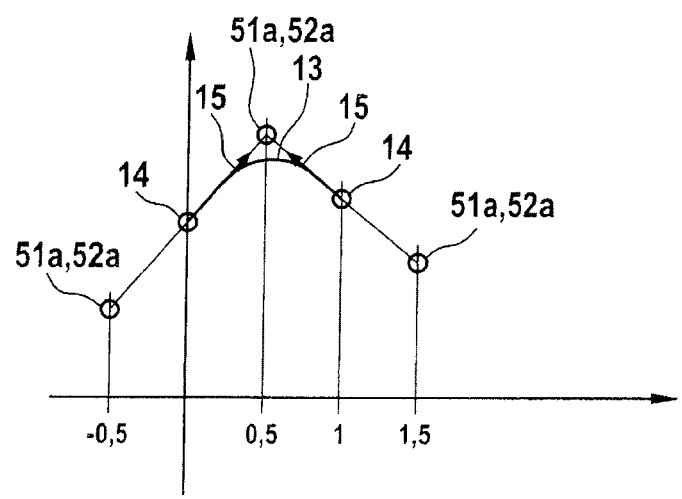
FIG. 6 is a schematic illustration of one direction of a two-dimensional interpolation when carrying out the method according to the exemplary embodiment of the present invention.

FIG. 5 schematically shows one approach for determining the first processing parameters, which result in a contrast optimization. Original pixels 8 are again present, which are to be processed to form improved pixels 9. Original pixels 8 again extend into a range, which is in a lower half of entire extension range 7 and constitutes only a small portion of entire extension range 7. Thus, an offset value and a multiplier are ascertained, the offset value being ascertained on the basis of a minimal brightness value of the pixels of associated block 30 and the multiplier being ascertained on the basis of the distribution of the brightness values of the pixels of associated block 30. This makes it possible to extend the range in which original pixels 8 extend, to entire extension range 7. An upper tolerance range 11 is again disregarded. A lower tolerance range 12 is equally disregarded. The pixels of block 30 are thus distributed over entire extension range 7, in particular, minus upper tolerance range 11 and minus lower tolerance range 12, as a result of which the contrast of each block 30 is enhanced.

Figure 7:
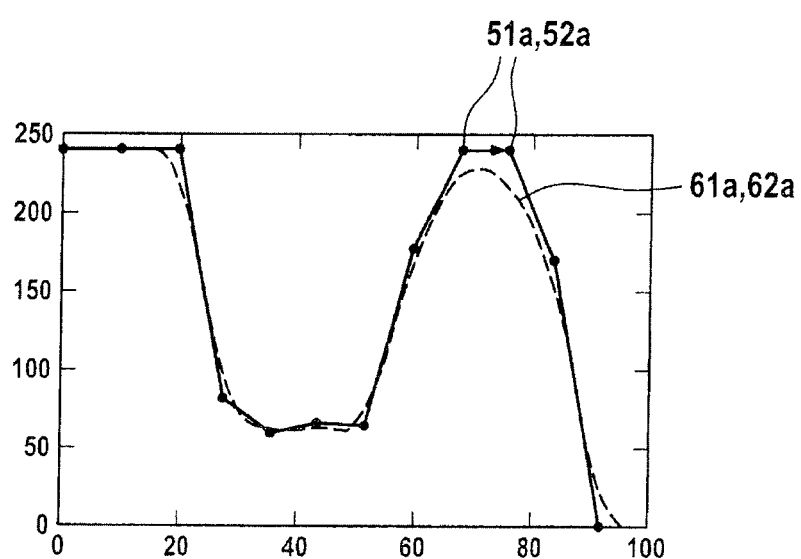
FIG. 7 is a further schematic illustration of the one direction of the two-dimensional interpolation when carrying out the method according to the exemplary embodiment of the present invention.

Interpolation 500 takes place, in particular, in the above-described second stage, with the aid of a polynomial interpolation, third degree polynomials being used. Interpolation 500 is two-stage, a distinction being made between a horizontal direction and a vertical direction. Thus, it is possible to ascertain horizontal processing parameters 51*a*, 52*a*, which are situated horizontally in the matrix of processing parameters 51, 52. With the aid of third degree polynomials, an interpolation takes place via these horizontal processing parameters 51*a*, 52*a*. Interpolation 500 in this case takes place in sections across three supporting points, this means in sections across three of processing parameters 51*a*, 52*a* in the horizontal direction. In this case, it is provided that at transition points 14 between two polynomials 13, which are ascertained in each case by sectional interpolation, aforementioned polynomials 13 have the same value and the same first derivation 15. The result of this is, in particular, that polynomials 13 all form a constant and differentiable curve, which extends over all horizontal values of processing parameters 51*a*, 52*a*. This is schematically shown in FIG. 7, horizontal processing parameters 51*a*, 52*a* by comparison being connected linearly in FIG. 7. It is apparent from FIG. 7 that the result of the polynomial interpolation in each case in sections across three points is that processing function 61*a*, 62*a* thus obtained does not exceed or only minimally exceeds the original values, i.e., horizontal processing parameters 51*a*, 52*a*. By providing the same values and the same first derivation 15 at transition points 14, a constant and overall differentiable curve is achieved. Transition points 14 may, for example, be intermediate points between two processing parameters 51, 52 or may be the processing parameters 51, 52 themselves.

Figure 8:
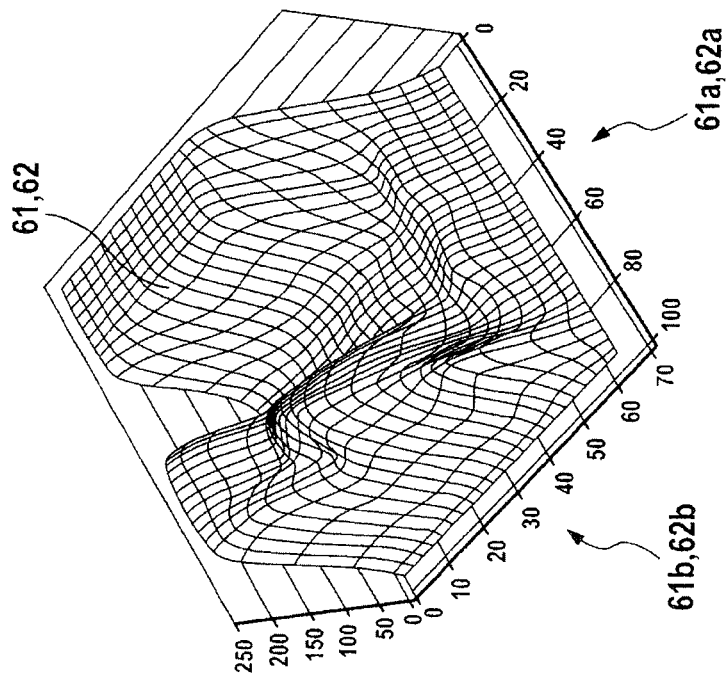
FIG. 8 is a schematic illustration of the two-dimensional interpolation during the implementation of the method according to the exemplary embodiment of the present invention.
Figure 8:
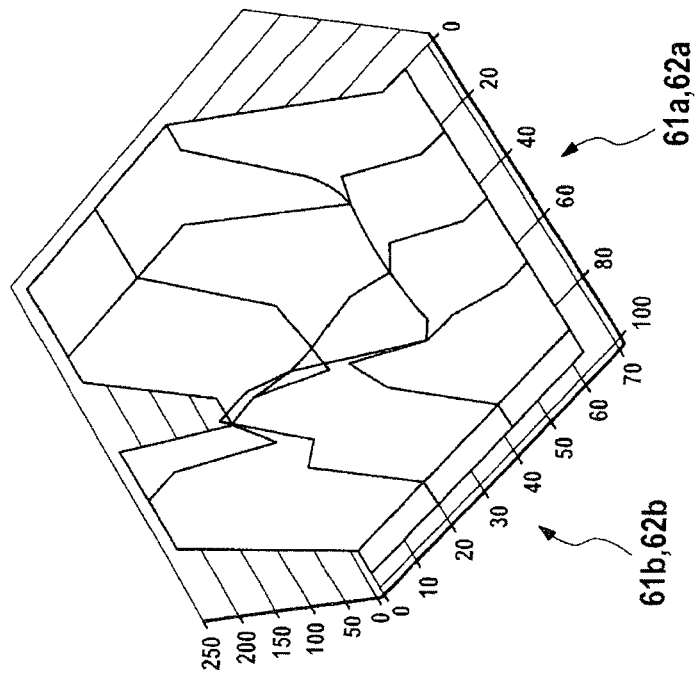

FIG. 8 shows that after the interpolation in the horizontal direction, an interpolation in the vertical direction takes place. Thus, in addition to horizontal processing function 61*a*, 62*a*, a vertical processing function 61*b*, 62*b* is also ascertained. These two functions are combined in order to thus obtain two-dimensional processing function 61, 62. Processing function 61, 62 may thus be applied to each individual pixel of map 20 in order to improve the brightness and/or the contrast.

Image 10 is obtained by applying processing function 61, 62 to map 20. In the process, either first processing function 61 may be applied for contrast optimization or second processing function 62 may be applied for brightness optimization or both processing functions 61, 62 may be applied. It should be noted that the contrast optimization and the brightness optimization do not operate exclusively for the respectively described optimization, but the brightness optimization may also improve the contrast and the contrast optimization may also improve the brightness. The name of each function merely indicates which effect is principally to be achieved.

In contrast to the conventional histogram adaptation of the related art, a possibility is therefore created for how a real-time capable optimization of maps is enabled using simple computing devices. A histogram adaptation thus need not take place separately. Instead, a reliable optimization may be achieved in real time with respect to brightness and contrast via the above-described optimization. The computing requirements in this case are very minimal, so that an implementation on a microprocessor is made possible.

What is claimed is:
1. A method for recording an image, comprising the following steps:
  detecting an area using a sensor and generating a map of the area having a predefined number of pixels which indicate brightness values, and subdividing the map into blocks having a predefined first size, the predefined first size having a first number of the pixels of the map;
  creating an auxiliary map by scaling down each of the blocks of the map to create a corresponding single block of the auxiliary map of a predefined second size, the predefined second size having a second number of pixels of the auxiliary map which is smaller than the first number of pixels of the predefined first size,
  sorting the pixels of each block of the auxiliary map according to their brightness values;
  determining processing parameters for each block of the auxiliary map based on the sorted pixels of the block of the auxiliary map, with which the pixels of an associated block of the map are to be processed to achieve a brightness maximization and/or a contrast maximization;

interpolating a processing function from the processing parameters; and applying the processing function to the pixels of the map to generate the image, wherein the scaling down of each of the blocks of the map to create the corresponding single block of the auxiliary map includes generating a single pixel in the block of the auxiliary map from a predefined number of pixels in a corresponding block of the map, with the value of the single pixel in the single block of the auxiliary map being assigned the value of one of the predefined number of pixels in the corresponding block of the map; and the determining the process parameters includes disregarding a predefined upper range of brightness values and/or lower range of brightness values for each of the blocks of the auxiliary map.

2. The method as recited in claim 1, wherein a scaling factor is determined as a processing parameter for each of the blocks of the auxiliary map, with which a maximum brightness value of the block is to be scaled to achieve a maximum brightness value that is representable by one pixel.

3. The method as recited in claim 2, wherein a predefined tolerance range of the pixel is disregarded for the maximum brightness value and/or for a minimum brightness value that is representable by the one pixel.

4. The method as recited in claim 1, wherein an offset value and a multiplier are ascertained as processing parameters for each of the blocks, the offset value being ascertained based on a minimal brightness value of the pixels of the block and the multiplier being ascertained based on a distribution of the brightness values of the pixels of the block, so that the brightness values of the pixels of the block, after subtraction of the offset value and subsequent multiplication by the multiplier, extend between a maximum brightness value and a minimum brightness value that is representable by one pixel.

5. The method as recited in claim 1, wherein the interpolating step includes a two-dimensional polynomial interpolation in sections using in each case a third degree polynomial across three adjacent processing parameters, respectively, the polynomials having the same value and the same first derivative at each transition point between two polynomials.

6. The method as recited in claim 1, wherein the second predefined size is 8×8 pixels.

7. A method for recording an image, comprising the following steps:

detecting an area using a sensor and generating a map of the area having a predefined number of pixels which indicate brightness values, and subdividing the map into blocks having a predefined first size, the predefined first size having a first number of the pixels of the map;

creating an auxiliary map by scaling down each of the blocks of the map to create a corresponding single block of the auxiliary map of a predefined second size, the predefined second size having a second number of pixels of the auxiliary map which is smaller than the first number of pixels of the predefined first size, sorting the pixels of each block of the auxiliary map according to their brightness values;

determining processing parameters for each block of the auxiliary map based on the sorted pixels of the block of the auxiliary map, with which the pixels of an associated block of the map are to be processed to achieve a brightness maximization and/or a contrast maximization;

interpolating a processing function from the processing parameters; and applying the processing function to the pixels of the map to generate the image, wherein the scaling down of each of the blocks of the map to create the corresponding single block of the auxiliary map includes generating a single pixel in the block of the auxiliary map from a predefined number of pixels in a corresponding block of the map, with the value of the single pixel in the single block of the auxiliary map being assigned the value of one of the predefined number of pixels in the corresponding block of the map; and the determining the process parameters includes disregarding a predefined number of maximum brightness values and/or minimum brightness values for each of the blocks of the auxiliary map.

8. A non-transitory machine-readable memory medium on which is stored a computer program for recording an image, the computer program, when executed by a computer, causing the computer to perform the following steps:

detecting an area using a sensor and generating a map of the area having a predefined number of pixels which indicate brightness values, and subdividing the map into blocks having a predefined first size, the predefined first size having a first number of the pixels of the map;

creating an auxiliary map by scaling down each of the blocks of the map to create a corresponding single block of the auxiliary map of a predefined second size, the predefined second size having a second number of pixels of the auxiliary map which is smaller than the first number of pixels of the predefined first size, sorting the pixels of each block of the auxiliary map according to their brightness values;

determining processing parameters for each block of the auxiliary map based on the sorted pixels of the block of the auxiliary map, with which the pixels of an associated block of the map are to be processed to achieve a brightness maximization and/or a contrast maximization;

interpolating a processing function from the processing parameters; and applying the processing function to the pixels of the map to generate the image, wherein the scaling down of each of the blocks of the map to create the corresponding single block of the auxiliary map includes generating a single pixel in the block of the auxiliary map from a predefined number of pixels in a corresponding block of the map, with the value of the single pixel in the single block of the auxiliary map being assigned the value of one of the predefined number of pixels in the corresponding block of the map; and the determining the process parameters includes disregarding a predefined upper range of brightness values and/or lower range of brightness values for each of the blocks of the auxiliary map.

9. A control unit configured to record an image, the control unit configured to:

detect an area using a sensor and generating a map of the area having a predefined number of pixels which indicate brightness values, and subdivide the map into blocks having a predefined first size, the predefined first size having a first number of the pixels of the map;

create an auxiliary map by scaling down each of the blocks of the map to create a corresponding single block of the auxiliary map of a predefined second size, the predefined second size having a second number of pixels of the auxiliary map which is smaller than the first number of pixels of the predefined first size, sort the pixels of each block of the auxiliary map according to their brightness values;

determine processing parameters for each block of the auxiliary map based on the sorted pixels of the block of the auxiliary map, with which the pixels of an associated block of the map are to be processed to achieve a brightness maximization and/or a contrast maximization;

interpolate a processing function from the processing parameters; and apply the processing function to the pixels of the map to generate the image, wherein the scaling down of each of the blocks of the map to create the corresponding single block of the auxiliary map includes generating a single pixel in the block of the auxiliary map from a predefined number of pixels in a corresponding block of the map, with the value of the single pixel in the single block of the auxiliary map being assigned the value of one of the predefined number of pixels in the corresponding block of the map; and the determining the process parameters includes disregarding a predefined upper range of brightness values and/or lower range of brightness values for each of the blocks of the auxiliary map.

\* \* \* \* \*